United States Patent [19]
Yeo

[11] Patent Number: 6,161,767
[45] Date of Patent: Dec. 19, 2000

[54] METHOD OF SENSING FAILURE OF THERMOSTAT IN VEHICLE

[75] Inventor: In-Joo Yeo, Ulsan, Rep. of Korea

[73] Assignee: Hyundai Motor Company, Seoul, Rep. of Korea

[21] Appl. No.: 09/468,609

[22] Filed: Dec. 21, 1999

[30] Foreign Application Priority Data

Aug. 16, 1999 [KR] Rep. of Korea .................. 99-33628

[51] Int. Cl.$^7$ ........................................... F01P 7/16
[52] U.S. Cl. .................. 236/94; 236/34.5; 165/11.1; 123/41.09
[58] Field of Search ................ 236/94, 34, 34.5; 165/11.1; 62/125, 126, 127, 129, 130, 133; 340/584, 585, 588; 123/41.02, 41.08, 41.09, 41.1

[56] References Cited

U.S. PATENT DOCUMENTS

| | | | |
|---|---|---|---|
| 4,381,549 | 4/1983 | Stamp, Jr. et al. | 165/11.1 X |
| 4,432,210 | 2/1984 | Saito | 62/126 |
| 5,115,643 | 5/1992 | Hayata et al. | 236/94 X |
| 5,123,252 | 6/1992 | Hanson | 236/94 X |

*Primary Examiner*—Harry B. Tanner
*Attorney, Agent, or Firm*—Birch, Stewart, Kolasch & Birch, LLP

[57] ABSTRACT

A method of sensing failure of a thermostat in a vehicle comprises the steps of sensing signals from various kinds of sensors after starting of the engine, and determining whether the signals are normal; determining whether the amount of intake air among the sensed signals from the sensors in the above step is larger than the amount of intake air during a predetermined period; accumulating the elapsed time by a given time at every predetermined time depending on the determination in the above step; determining whether the accumulated time obtained in the above step has reached a predetermined time for determining the failure; sensing the temperature of the coolant when the accumulated time in the above step has reached the predetermined time for determining the failure, and determining whether the sensed temperature of the coolant is below a predetermined temperature of the coolant; and indicating failure alarm when the sensed temperature of the coolant in the above step is below the predetermined temperature of the coolant, thereby previously preventing overheat of an engine in the vehicle by sensing the failure of the thermostat which opens and closes a coolant passage depending on the temperature of the coolant for cooling the engine.

3 Claims, 2 Drawing Sheets

METHOD OF SENSING FAILURE OF THERMOSTAT IN VEHICLE

BACKGROUND OF THE INVENTION

1. Field of the Invention

The present invention relates to a method of sensing failure of a thermostat in a vehicle, and more particularly, to a method of sensing failure of the thermostat in the vehicle to previously prevent overheat of an engine in the vehicle by sensing the failure of the thermostat which opens and closes a coolant passage depending on the temperature of the coolant for cooling the engine.

2. Description of the Prior Art

Generally, a vehicle is provided with a cooling system for cooling the engine to keep the temperature of the engine suitable while the vehicle is traveling. The cooling system is classified into an air cooling type using air and a water cooling type using water, depending on the cooling method. The cooling system circulates air or water naturally or forcibly and cools the engine.

In the case of the cooling system using the coolant (cooling water) among them, on an outlet portion of a water jacket formed between a cylinder block and a cylinder head of an engine, a thermostat which suitably adjusts the temperature of the coolant flowing coolant passages is mounted.

Therefore, the thermostat is closed and prevents the coolant from flowing into a radiator when the temperature of the coolant is below a normal temperature. As the temperature of the coolant becomes closer to the normal temperature, the thermostat begins to gradually open. When it reaches the normal temperature, the thermostat fully opens to permit the coolant to flow into the radiator, thereby adjusting the temperature of the coolant and cooling the engine.

A thermostat includes a bellows type and a pellet type. For the bellows type thermostat, the bellows made of thin metal plate and a valve are assembled and volatile liquid, such as alcohol, is hermetically contained in the bellows. The coolant passage is configured to be opened and closed by the elongation and compression of the bellows due to the expansion and contraction of the hermetically contained liquid according to the temperature of the coolant.

For the pellet type thermostat, the thermostat comprises a shaft attached to a case, and a valve and a spring installed on a small cylinder. Wax and synthetic rubber are hermetically contained in the cylinder. When the temperature rises, a membrane made of synthetic rubber is compressed by expansion of wax and in turn, the cylinder urges the spring and is lowered to open the valve. When the temperature lowers, since liquid wax is solidified and contracted, the rubber membrane returns to an original position and the valve is closed. By such opening and closing operation, the coolant is circulated and cools the engine.

As described above, the thermostat effectuates the operation of cooling the engine while opening and closing the valve by expansion and contraction of the hermetically contained liquid according to the temperature of coolant. Thus, if malfunction sometimes occurs upon opening and closing the valve due to inferiority, defects and deteriorated durability of parts, normal cooling operation is not carried out and thus, the engine is overheated. Further, the overheat of the engine causes deformation of each of parts and even damage of the engine as well as knocking or pre-ignition in the combustion state in the engine. As a result, there is a problem that the power of the engine lowers.

SUMMARY OF THE INVENTION

The object of the invention is to previously prevent deformation of each of parts, damage of an engine and the lowering of power due to failure of a thermostat, by sensing operating state of the thermostat for opening and closing a valve and for circulating coolant so as to cool the engine according to the temperature of the coolant while a vehicle is traveling and by determining whether failure of the thermostat occurs based on the sensed signals and representing an alarm to a driver when the failure occurs.

In order to achieve the object, the present invention comprises the steps of sensing signals from various kinds of sensors after starting of the engine, and determining whether the signals are normal; determining whether the amount of intake air among the sensed signals from the sensors in the above step is larger than the amount of intake air during a predetermined period; accumulating the elapsed time by a given time at every predetermined time depending on the determination in the above step; determining whether the accumulated time obtained in the above step has reached a predetermined time for determining the failure; sensing the temperature of the coolant when the accumulated time in the above step has reached the predetermined time for determining the failure, and determining whether the sensed temperature of the coolant is below a predetermined temperature of the coolant; and indicating failure alarm when the sensed temperature of the coolant in the above step is below the predetermined temperature of the coolant.

Thus, according to the present invention, when the amount of intake air among the signals sensed from various kinds of sensors after starting of the engine is larger than the amount of intake air during a predetermined period, the elapsed time is accumulated. In the case that the accumulated time is larger than a predetermined time for determining the failure, if the sensed temperature of the coolant is below a normal temperature (if the temperature of the coolant has not yet reached the normal temperature although the amount of intake air is sufficient and the predetermined time for determining the failure lapses), it is determined that the temperature of the coolant has not reached the normal temperature because the valve of the thermostat is not operated smoothly. At this time, an alarm for indicating the failure is represented.

DETAILED DESCRIPTION OF THE INVENTION

Hereinafter, a preferred embodiment of the present invention will be described in detail with reference to the accompanying drawings.

Figure 1:
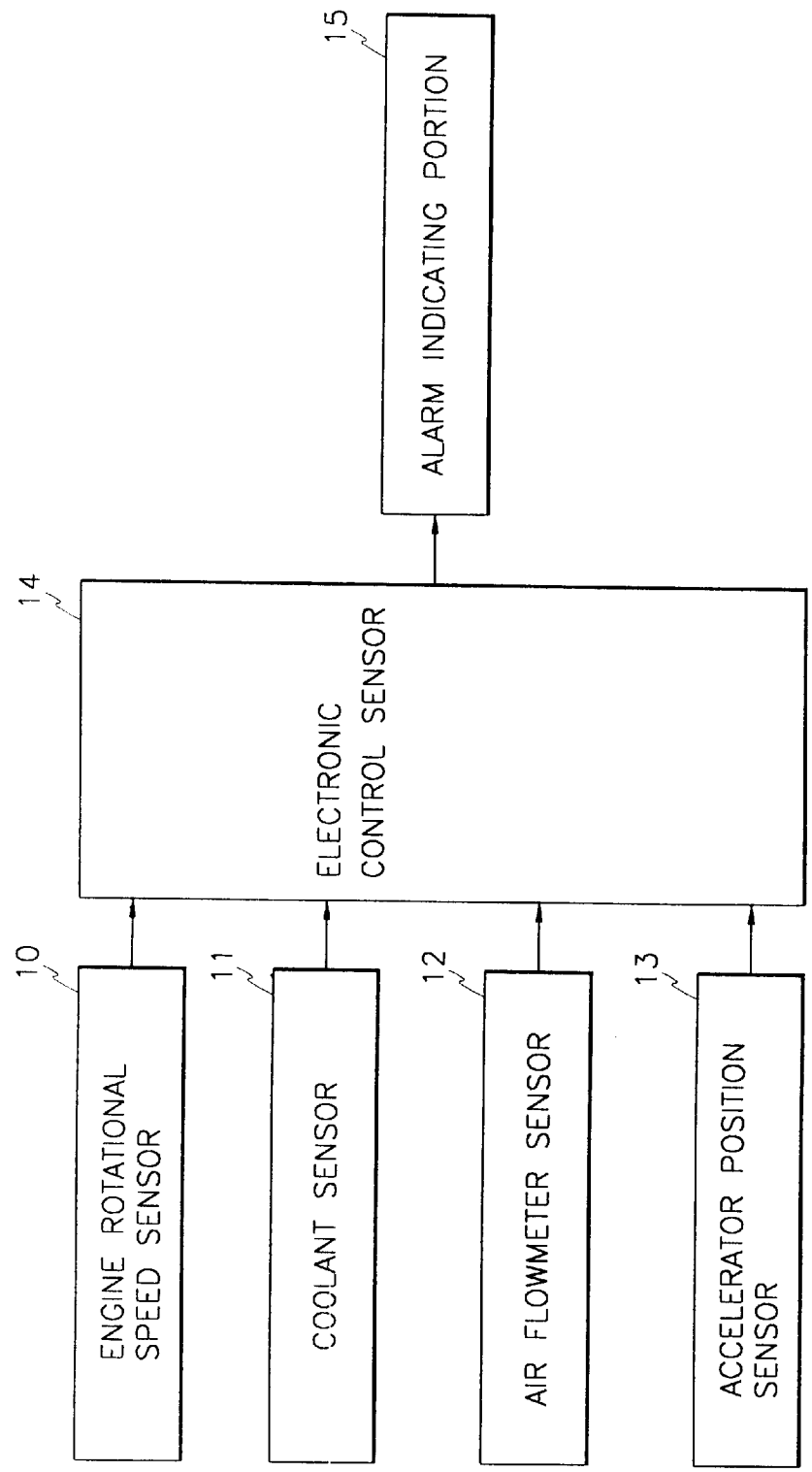
FIG. 1 is a block diagram of a control for sensing failure of a thermostat in a vehicle employed in the present invention.
Figure 2:
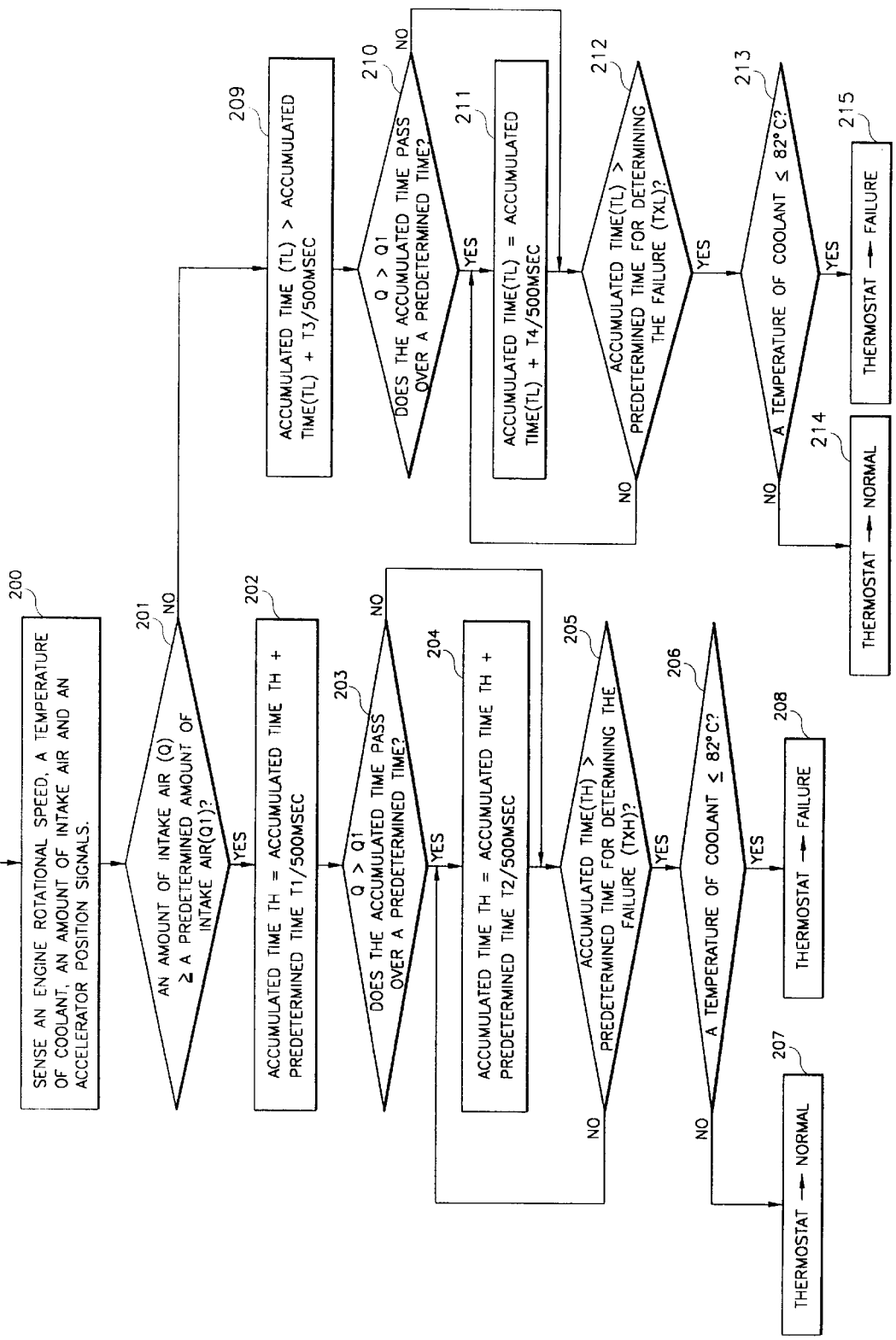
FIG. 2 is a flow chart of a method of sensing failure of the thermostat in the vehicle according to the present invention.

FIG. 1 is a block diagram of a control for sensing failure of a thermostat in a vehicle employed in the present invention. The control comprises an engine rotational speed sensor 10 for sensing the number of revolution of the engine, a coolant sensor 11 for sensing the temperature of the coolant for preventing overheat of the engine, an air flowmeter 12 for sensing the amount of the intake air, an accelerator position sensor 13 sensing the opening angle of a throttle valve, an electronic control device 14 for outputting signals corresponding to the determination by the comparison of the amount of intake air, the accumulated time and the temperature of the coolant with predetermined reference values through a predetermined algorithm into which the signals sensed from the sensors are inputted, and alarm indicating portion 15 for receiving control signals output from the electronic control device 14 and representing an alarm.

According to the present invention, when a vehicle begins to travel, the engine rotational speed, the temperature of coolant, the amount of intake air and the accelerator position sensed from the engine rotational speed sensor 10, the coolant sensor 11, the air flowmeter 12 and the accelerator position sensor 13 are inputted into the electronic control device 14 (step 200).

In turn, the electronic control device 14 determines whether the inputted amount of intake air Q is above a predetermined amount of intake air Q1 (step 201).

At this time, if the inputted amount of intake air Q is larger than the predetermined amount of intake air Q1 (if there is a plenty of intake air), the electronic control device 14 determines the present state to be a high load condition, i.e., a high speed traveling condition, while computing an accumulated time TH by accumulating traveling time after starting of the engine as follows (step 202):

Accumulated time TH=Accumulated time TH+Predetermined time T1/500 msec

With the accumulated time TH computed as described above, the electronic control device 14 determines whether the accumulated time TH passes over a predetermined time, in the state that the amount of intake air Q is above the predetermined amount of intake air Q1. This is to rapidly cope instantaneous variations in the traveling speed since the traveling speed is varied while the vehicle is traveling (step 203).

Therefore, if the computed, accumulated time TH has passed over the predetermined time, the electronic control device 14 determines that the vehicle is traveling without variations in the traveling speed and computes the accumulated time TH by accumulating traveling time as follows (step 204):

Accumulated time TH=Accumulated time TH+Predetermined time T2/500 msec

When the accumulated time TH has been computed as described above, the electronic control device 14 determines whether the computed, accumulated time TH has reached the predetermined time for determining the failure TXH (step 205).

However, in the state that the amount of intake air Q is above the predetermined amount of intake air Q1, if the accumulated time TH has not yet passed over the predetermined time, the electronic control device 14 determines that the traveling speed has been varied. Thus, the electronic control device 14 determines whether the just computed, accumulated time TH has reached the predetermined time for determining the failure TXH, without computing the accumulated time TH again.

On the other hand, if the accumulated time TH has not reached the predetermined time for determining the failure TXH, the electronic control device 14 determines that the condition for determining the failure has not yet been accomplished. Thus, the electronic device 14 computes the accumulated time TH again and determines whether the re-computed, accumulated time TH has reached the predetermined time for determining the failure TXH.

At this time, if the re-computed, accumulated time TH has reached the predetermined time for determining the failure TXH, the electronic control device 14 determines whether the temperature of the coolant sensed from the coolant sensor 11 is below the normal temperature of the coolant of 82° C. (step 206).

At this time, if the temperature of the coolant is below the normal temperature of the coolant of 82° C., based on the fact that the temperature of the coolant is not above the normal temperature of the coolant of 82° C. but below the normal temperature of the coolant although the amount of intake air Q flows into above the predetermined amount of intake air Q1, the predetermined time for determining the failure TXH lapses and the vehicle is traveling at a high speed, the electronic control device 14 determines that the flow of the coolant due to abnormal operation of the thermostat occurs. At this time, the electronic control device 14 indicates the failure of the thermostat through the alarm indicating portion 15 (step 208).

On the other hand, if the temperature of the coolant is above the normal temperature of the coolant of 82° C., the electronic control device 14 determines that the temperature of the coolant is above the normal temperature of the coolant of 82° C. since the amount of intake air Q flows into above the predetermined amount of intake air Q1, the predetermined time for determining the failure TXH lapses, the vehicle is traveling at a high speed and the thermostat is normally operated. Thus, the electronic control device 14 indicates through the alarm indicating portion 15 that the thermostat is normal (step 207).

On the other hand, if the electronic control device 14 determines that the inputted amount of intake air Q is below the predetermined amount of intake air Q1 (step 201), the electronic control device 14 determines the present state to be a low load condition, i.e., idle condition and computes the accumulated time TL by accumulating idling time after starting of the engine as follows (step 209):

Accumulated time TL=Accumulated time TL+Predetermined time T3/500 msec

With the accumulated time TL computed as described above, the electronic control device 14 determines whether the accumulated time TL has passed over a predetermined time (longer than that at high speed traveling), in the state that the amount of intake air Q is below the predetermined amount of intake air Q1 (step 210). At this time, if the computed, accumulated time TL has passed over the predetermined time, the electronic control device 14 determines that the vehicle is traveling without variations in the traveling speed and computes the accumulated time TL by accumulating traveling time as follows (step 211):

Accumulated time TL=Accumulated time TL+Predetermined time T4/500 msec

When the accumulated time TL has been computed as described above, the electronic control device 14 determines whether the computed, accumulated time TL has reached the predetermined time for determining the failure TXH (step 212).

However, in the state that the amount of intake air Q is below the predetermined amount of intake air Q1, if the accumulated time TL has not passed over the predetermined time, the electronic control device 14 determines that the traveling speed has been varied. Thus, the electronic control device 14 determines whether the just computed, accumulated time TL has reached the predetermined time for determining the failure TXH, without computing the accumulated time TL again.

On the other hand, if the accumulated time TL has not reached the predetermined time for determining the failure TXH, the electronic control device 14 determines that the condition for determining the failure has not yet been accomplished. Thus, the electronic device 14 computes the accumulated time TL again and determines whether the re-computed, accumulated time TL has reached the predetermined time for determining the failure TXH longer than that at high speed traveling.

Therefore, if the re-computed, accumulated time TL has reached the predetermined time for determining the failure TXH, the electronic control device 14 determines whether the temperature of the coolant sensed from the coolant sensor 11 is below the normal temperature of the coolant of 82° C. (step 213).

At this time, if the temperature of the coolant is below the normal temperature of the coolant of 82 ° C., based on the fact that the temperature of the coolant is not above the normal temperature of the coolant of 82 ° C. but below the normal temperature of the coolant although the amount of intake air Q flows into below the predetermined amount of intake air Q1, the predetermined time for determining the failure TXH longer than that at high speed traveling lapses and the vehicle is idling, the electronic control device 14 determines that the flow of the coolant due to abnormal operation of the thermostat occurs. At this time, the electronic control device 14 indicates the failure of the thermostat through the alarm indicating portion 15 (step 215).

On the other hand, if the temperature of the coolant is above the normal temperature of the coolant of 82° C., the electronic control device 14 determines that the temperature of the coolant is above the normal temperature of the coolant of 82 ° C. since the amount of intake air Q flows into below the predetermined amount of intake air Q1, the predetermined time for determining the failure TXH longer than that at high speed traveling lapses and the thermostat is normally operated. Thus, the electronic control device 14 indicates through the alarm indicating portion 15 that the thermostat is normal (step 214).

As described above, the present invention detects the operating condition of the thermostat for opening and closing the valve and circulating the coolant to cool the engine according to the temperature of the coolant while the vehicle is traveling, based on the amount of intake air, the predetermined time for determining the failure and the temperature of the coolant sensed from various sensors. From the sensed signals, the failure of the thermostat is determined and an alarm is represented to a driver if the failure occurs. Thus, the present invention provides the effects of previously preventing deformation of each of parts, damage of the engine and the lowering of power resulting from overheat of the engine due to the failure of the thermostat.

What is claimed is:

1. A method of sensing failure of a thermostat in a vehicle comprising the steps of:

sensing signals from various kinds of sensors after starting of an engine, and determining whether the signals are normal;

determining whether an amount of intake air among the sensed signals from the sensors in the above step is larger than an amount of intake air during a predetermined period;

accumulating an elapsed time by a given time at every predetermined time depending on the determination in the above step;

determining whether the accumulated time obtained in the above step has reached a predetermined time for determining the failure;

sensing the temperature of the coolant when the accumulated time in the above step has reached the predetermined time for determining the failure, and determining whether the sensed temperature of the coolant is below a predetermined temperature of the coolant; and indicating failure alarm when the sensed temperature of the coolant in the above step is below the predetermined temperature of the coolant.

2. The method as claimed in claim 1, comprising the step of determining whether the accumulated time has reached the predetermined time for determining the failure if the accumulated time has not reached a predetermined time and of accumulating the accumulated time by a given time and determining by this accumulated time whether the failure occurs if the accumulated time has passed over the predetermined time, in the state that the amount of intake air is below the predetermined amount of intake air under the steps of determining whether the amount of intake air is larger than the predetermined amount of intake air and of determining whether the accumulated time has reached the predetermined time.

3. The method as claimed in claim 1, wherein high load condition or idling condition of the engine is determined based on whether the amount of intake air is above or below the predetermined amount of intake air under the step of determining whether the amount of intake air is larger than the predetermined amount of intake air, and wherein according to the determination of the condition of the engine, the accumulated time is accumulated by short or long time and the predetermined time for determining the failure is configured to be set lengthily or shortly.

* * * * *